United States Patent
Firintepe

(10) Patent No.: US 11,592,677 B2
(45) Date of Patent: Feb. 28, 2023

(54) SYSTEM AND METHOD FOR CAPTURING A SPATIAL ORIENTATION OF A WEARABLE DEVICE

(71) Applicant: Bayerische Motoren Werke Aktiengesellschaft, Munich (DE)

(72) Inventor: Ahmet Firintepe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/450,776

(22) Filed: Oct. 13, 2021

(65) Prior Publication Data
US 2022/0113546 A1 Apr. 14, 2022

(30) Foreign Application Priority Data
Oct. 14, 2020 (DE) ...................... 10 2020 126 953.6

(51) Int. Cl.
G02B 27/01 (2006.01)

(52) U.S. Cl.
CPC ....... G02B 27/0179 (2013.01); G02B 27/017 (2013.01); G02B 2027/0138 (2013.01); G02B 2027/0178 (2013.01); G02B 2027/0183 (2013.01); G02B 2027/0187 (2013.01)

(58) Field of Classification Search
CPC .............. G02B 27/0179; G02B 27/017; G02B 2027/0138; G02B 2027/0178; G02B 2027/0183; G02B 2027/0187; G06F 3/012; B60R 16/02
See application file for complete search history.

(56) References Cited

U.S. PATENT DOCUMENTS

| | | | | |
|---|---|---|---|---|
| 5,742,264 A * | 4/1998 | Inagaki | ................... | G09G 5/397 348/E5.145 |
| 5,831,584 A * | 11/1998 | Socks | ...................... | G06F 3/011 345/158 |
| 2006/0197832 A1* | 9/2006 | Yamada | ............... | G02B 27/017 348/E5.145 |
| 2008/0183388 A1* | 7/2008 | Goodrich | ............. | A61B 5/1455 235/492 |
| 2012/0287040 A1* | 11/2012 | Moore | .................... | G06F 3/012 345/157 |

(Continued)

FOREIGN PATENT DOCUMENTS

DE 10 2014 225 222 A1 6/2016

OTHER PUBLICATIONS

German-language Office Action issued in German Application No. 10 2020 126 953.6 dated Aug. 31, 2021 (six (6) pages).

*Primary Examiner* — Dmitriy Bolotin
(74) *Attorney, Agent, or Firm* — Crowell & Moring LLP

(57) ABSTRACT

A system and method capture a spatial orientation of a wearable device. The system has at least one capturing unit and at least one processor unit. The at least one capturing unit is designed to capture at least one first position parameter in relation to the wearable device and to capture at least one second position parameter in relation to a body part of a person on which the wearable device is arranged. The at least one processor unit is designed to determine a spatial orientation of the wearable device on the basis of the at least one first position parameter and the at least one second position parameter.

12 Claims, 2 Drawing Sheets

(56) References Cited

U.S. PATENT DOCUMENTS

| | | | | |
|---|---|---|---|---|
| 2014/0184496 | A1* | 7/2014 | Gribetz | G06F 3/013 |
| | | | | 345/156 |
| 2015/0097860 | A1* | 4/2015 | Alaniz | G06T 11/60 |
| | | | | 345/633 |
| 2015/0234186 | A1* | 8/2015 | Meadows | G02B 27/017 |
| | | | | 345/8 |
| 2015/0309562 | A1* | 10/2015 | Shams | G08B 6/00 |
| | | | | 345/8 |
| 2015/0378156 | A1* | 12/2015 | Kuehne | G02B 27/017 |
| | | | | 345/8 |
| 2016/0063332 | A1* | 3/2016 | Sisbot | G06V 20/58 |
| | | | | 382/104 |
| 2017/0010850 | A1* | 1/2017 | Kobayashi | G02B 27/0172 |
| 2017/0146800 | A1* | 5/2017 | Knight | B64D 43/00 |
| 2017/0343823 | A1* | 11/2017 | Tagawa | G02B 27/0172 |
| 2018/0284914 | A1* | 10/2018 | Yanai | G06T 19/006 |
| 2018/0285698 | A1* | 10/2018 | Yamada | G06V 30/194 |
| 2018/0342078 | A1* | 11/2018 | Watanabe | G06T 7/0012 |
| 2019/0009175 | A1* | 1/2019 | Buxton | A63F 13/525 |
| 2019/0371196 | A1* | 12/2019 | Pittman | G09B 9/05 |
| 2020/0013225 | A1* | 1/2020 | Park | B60Q 9/008 |
| 2020/0050194 | A1* | 2/2020 | Choi | B60W 60/0054 |
| 2020/0216078 | A1 | 7/2020 | Katz | |
| 2020/0271925 | A1* | 8/2020 | Robinson | G02B 27/017 |

* cited by examiner

SYSTEM AND METHOD FOR CAPTURING A SPATIAL ORIENTATION OF A WEARABLE DEVICE

CROSS REFERENCE TO RELATED APPLICATIONS

This application claims priority under 35 U.S.C. § 119 from German Patent Application No. 10 2020 126 953.6, filed Oct. 14, 2020, the entire disclosure of which is herein expressly incorporated by reference.

BACKGROUND AND SUMMARY OF THE INVENTION

The present disclosure relates to a system for capturing a spatial orientation of a wearable device, to a vehicle having such a system, to an assistance system having such a system, to a method for capturing a spatial orientation of a wearable device and to a storage medium for executing the method. The present disclosure relates in particular to tracking of smart glasses using facial information relating to a wearer of the smart glasses.

Smart glasses are wearable computers that are able to add information to the field of view of the user, for example in order to enable augmented reality. Such smart glasses may also be used in vehicles in order to offer a user a seamless and believable illusion by way of virtual elements incorporated into the surroundings. In order to allow the virtual elements to be displayed correctly, it is necessary to determine a pose of the smart glasses. This may be performed for example by way of a camera that records the smart glasses. Such conventional tracking systems however do not achieve the accuracy desired for augmented reality, in particular due to the typically limited number of object features.

One object of the present disclosure is to provide a system for capturing a spatial orientation of a wearable device, a vehicle having such a system, an assistance system having such a system, a method for capturing a spatial orientation of a wearable device and a storage medium for executing the method, all of which allow improved tracking of a spatial orientation of the wearable device. One object of the present disclosure is in particular to improve the provision of augmented reality (AR) content for wearable devices.

This object is achieved by the subject matter of the independent claims. Advantageous refinements are specified in the dependent claims.

According to one independent aspect of the present disclosure, what is specified is a system for capturing a spatial orientation of a wearable device, in particular of smart glasses. The system comprises at least one capturing unit and at least one processor unit. The at least one capturing unit is designed to capture at least one first position parameter in relation to the wearable device and to capture at least one second position parameter in relation to a body part of a person on which the wearable device is arranged. The at least one processor unit is designed to determine a spatial orientation of the wearable device on the basis of the at least one first position parameter and the at least one second position parameter.

According to the invention, a combination of two different tracking processes is used to ascertain the spatial orientation of the wearable device. In particular, both the wearable device itself (e.g., smart glasses) and the body part (e.g., a head or face), on which the wearable device is arranged, are captured and used to determine the spatial orientation of the wearable device. This allows improved provision of augmented reality (AR) content.

The term "augmented reality" as used in the context of the present disclosure refers to a computer-aided expansion of the perception of reality for a user. The term "augmented reality" in particular refers to a visual display of information, such as for example computer-generated additional information or virtual objects, through inlaying or superimposition.

The wearable device is preferably a pair of smart glasses. Smart glasses are wearable devices that add information to the field of view of the user or wearer, for example in the context of augmented reality.

The body part on which the wearable device is arranged is preferably a head of a user, and in particular a face of the user or wearer of the wearable device. The user may be for example a driver of a vehicle.

The terms "orientation" or "spatial orientation", as used in the context of the present disclosure, refer to an arrangement or pose of the wearable device in three-dimensional space. The spatial orientation can be suitably derived from the at least one first position parameter and the at least one second position parameter.

The position parameters may comprise one-dimensional, two-dimensional or three-dimensional information in relation to the wearable device and the body part. The position parameters may in this case be absolute or relative.

The first position parameter, which relates to the wearable device, may for example specify a position of a certain structural feature of the wearable device, for example a lateral edge, a central element between the lenses, etc. The second position parameter, which relates to the body part of the person, may for example specify a position of a facial feature such as a position of the tip of the nose, an ear, etc.

In this context, the first and second position parameters are used in combination in order to determine the exact pose of the wearable device. By way of example, the head of a person and a pair of smart glasses can be located on the basis of individual images recorded in the passenger compartment by way of cameras.

Preferably, the system comprises a learning unit, which is designed to carry out deep learning on the basis of the captured data from the at least one capturing unit. Deep learning in this case denotes a machine learning method that uses artificial neural networks with intermediate layers or hidden layers between the input layer and output layer and thereby expands an internal structure.

Hence, the system can determine the pose from individual images significantly more precisely with the aid of deep learning, for example by virtue of learning a relationship between the head and the pair of smart glasses. The images of the smart glasses and the face that appear in different positions and orientations may in this case be used as training data. A ground truth of the position and orientation may be recorded at the same time as these data. The system may be trained using a deep learning method with the aid of these labeled data.

In some embodiments, training is performed by way of deep learning before the system is used in a vehicle, that is to say before use in real operation. In further embodiments, the system may be further trained during use in real operation in order to continually improve the determination of the pose of the smart glasses.

In some embodiments, training with different faces and smart glasses may additionally make it possible to track different persons and smart glasses. This leads to a high degree of scalability. In contrast to conventional approaches, training is possible in such a manner that different persons with different smart glasses are able to be recognized and located as soon as they are visible in a camera image, for example.

The system is preferably designed to provide an augmented reality (AR) function for the wearable device based on the determined spatial orientation of the wearable device.

The system is preferably designed to capture the spatial orientation of the wearable device in relation to a passenger compartment of a vehicle. By way of example, a driver of the vehicle, wearing smart glasses, is thus able to be provided with augmented reality content adapted to a movement of the vehicle and a movement of the head of the driver or of the smart glasses.

The at least one capturing unit preferably comprises a camera, in particular a passenger compartment camera. By way of example, the camera can record a pair of smart glasses and the face of the user such that the exact pose of the smart glasses may be determined on the basis of the features of the smart glasses and facial features. In some embodiments, the camera may be an infrared camera, this being advantageous due to the controlled, largely interference-free and consistent exposure of the image data.

The at least one processor unit is a programmable arithmetic unit, that is to say a machine or an electronic circuit, that controls other elements in accordance with transmitted commands and in the process drives an algorithm (process).

According to a further independent aspect of the present disclosure, what is specified is a vehicle, in particular a motor vehicle. The vehicle comprises the system for capturing a spatial orientation of a wearable device, in particular of smart glasses, according to the embodiments of the present disclosure.

The term vehicle comprises automobiles, trucks, buses, RVs, motorcycles, etc. used to transport people, goods, etc. The term in particular comprises passenger transport motor vehicles.

According to a further independent aspect of the present disclosure, what is specified is an assistance system, in particular for a vehicle. The assistance system comprises the system for capturing a spatial orientation of a wearable device according to the embodiments of the present disclosure and the wearable device, such as for example smart glasses.

The wearable device is preferably a pair of glasses, and in particular a pair of augmented reality (AR) glasses or smart glasses.

According to a further independent aspect of the present disclosure, what is specified is a method for capturing a spatial orientation of a wearable device, in particular of smart glasses. The method comprises capturing at least one first position parameter in relation to the wearable device; capturing at least one second position parameter in relation to a body part of a person on which the wearable device is arranged; and determining a spatial orientation of the wearable device on the basis of the at least one first position parameter and the at least one second position parameter.

The method may implement the aspects of the system described in this document for capturing a spatial orientation of a wearable device, in particular of smart glasses.

According to a further independent aspect, what is specified is a software (SW) program. The SW program may be designed to be executed on one or more processors in order thereby to execute the method described in this document for capturing a spatial orientation of a wearable device, in particular of smart glasses.

According to a further independent aspect, what is specified is a storage medium. The storage medium may comprise an SW program that is designed to be executed on one or more processors in order thereby to execute the method described in this document for capturing a spatial orientation of a wearable device, in particular of smart glasses.

According to a further independent aspect of the present disclosure, software containing program code for performing the method for capturing a spatial orientation of a wearable device, in particular of smart glasses, is to be executed when the software runs on one or more software-controlled apparatuses.

Other objects, advantages and novel features of the present invention will become apparent from the following detailed description of one or more preferred embodiments when considered in conjunction with the accompanying drawings.

BRIEF DESCRIPTION OF THE DRAWINGS

Unless indicated otherwise, the same reference signs are used for identical and functionally identical elements below.

DETAILED DESCRIPTION OF THE DRAWINGS

Figure 1:
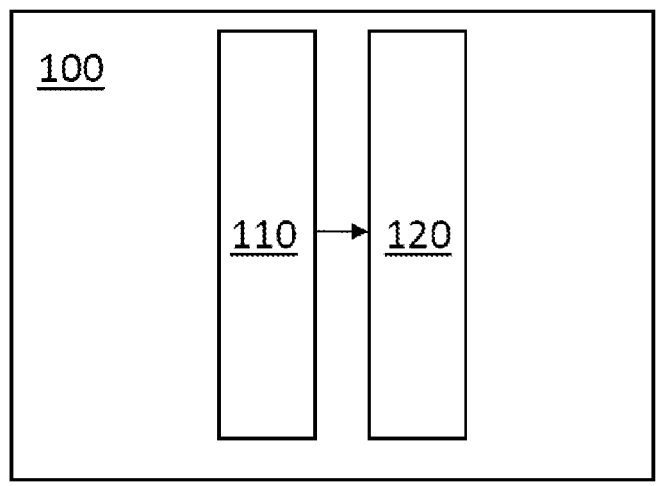
FIG. 1 schematically shows a system for capturing a spatial orientation of a wearable device according to embodiments of the present disclosure.
Figure 2:
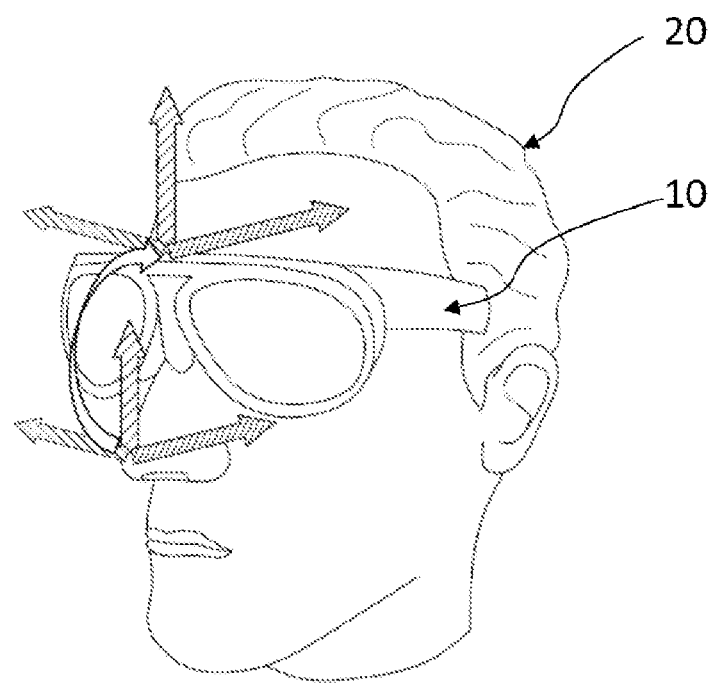
FIG. 2 schematically shows smart glasses worn by a user according to embodiments of the present disclosure.

FIG. 1 schematically shows a system 100 for capturing a spatial orientation of a wearable device according to embodiments of the present disclosure. FIG. 2 schematically shows smart glasses 10 worn by a user according to embodiments of the present disclosure.

The system 100 comprises at least one capturing unit 110 and at least one processor unit 120. The at least one capturing unit 110, which may be a camera for example, is designed to capture at least one first position parameter in relation to the wearable device 10 and to capture at least one second position parameter in relation to a body part 20 of a person on which the wearable device 10 is arranged. The at least one processor unit 120 is designed to determine or ascertain a spatial orientation of the wearable device 10 on the basis of the at least one first position parameter and the at least one second position parameter.

The system 100 may be used for example to determine the pose (or position and orientation) of augmented reality glasses in the vehicle passenger compartment using learning-based methods. As a result, a user is able to be offered a seamless and believable illusion in the smart glasses by way of the virtual elements incorporated into the (real) surroundings. In particular, a pair of smart glasses may be located precisely by the combination of two different tracking processes. This allows an accurate display of virtual objects in the smart glasses.

In an exemplary embodiment, the omnipresent information relating to a head when wearing a pair of smart glasses is utilized for a more accurate determination. Other tracking systems, which either only track the face or only track the glasses, do not attain the necessary accuracy. As a rule, those approaches that use the face on the basis of naturally present features (such as the corner of the mouth, nose wings, eyes, etc.) do not attain the accuracy required for augmented reality, particularly because some of the features may be covered by the glasses. On their own, methods that only track the smart glasses do not attain better results either on account of the typically restricted number of object features. By contrast, the combination according to the invention facilitates an accurate display of virtual objects on the smart glasses.

With reference to the example in FIG. 2, a pair of smart glasses 10 can be localized on the basis of individual images which are recorded in the passenger compartment by cameras. In particular, the system may exactly determine the pose of the smart glasses 10 from the individual images with the aid of deep learning by virtue of learning the relationship between the head 20 and the smart glasses 10. By way of example, the images of the smart glasses 10 and the face 20 that appear in different positions and orientations may be used as training data. A ground truth of the position and orientation of the smart glasses 10 may be recorded at the same time as these data. The system may be trained using a deep learning method with the aid of these labeled data.

Training with different faces and smart glasses may in this case make it possible to track different persons and smart glasses. This leads to a high degree of scalability. In contrast to other systems, it is consequently possible to recognize and locate various persons with different data glasses as soon as they become visible in the camera image.

Figure 3:
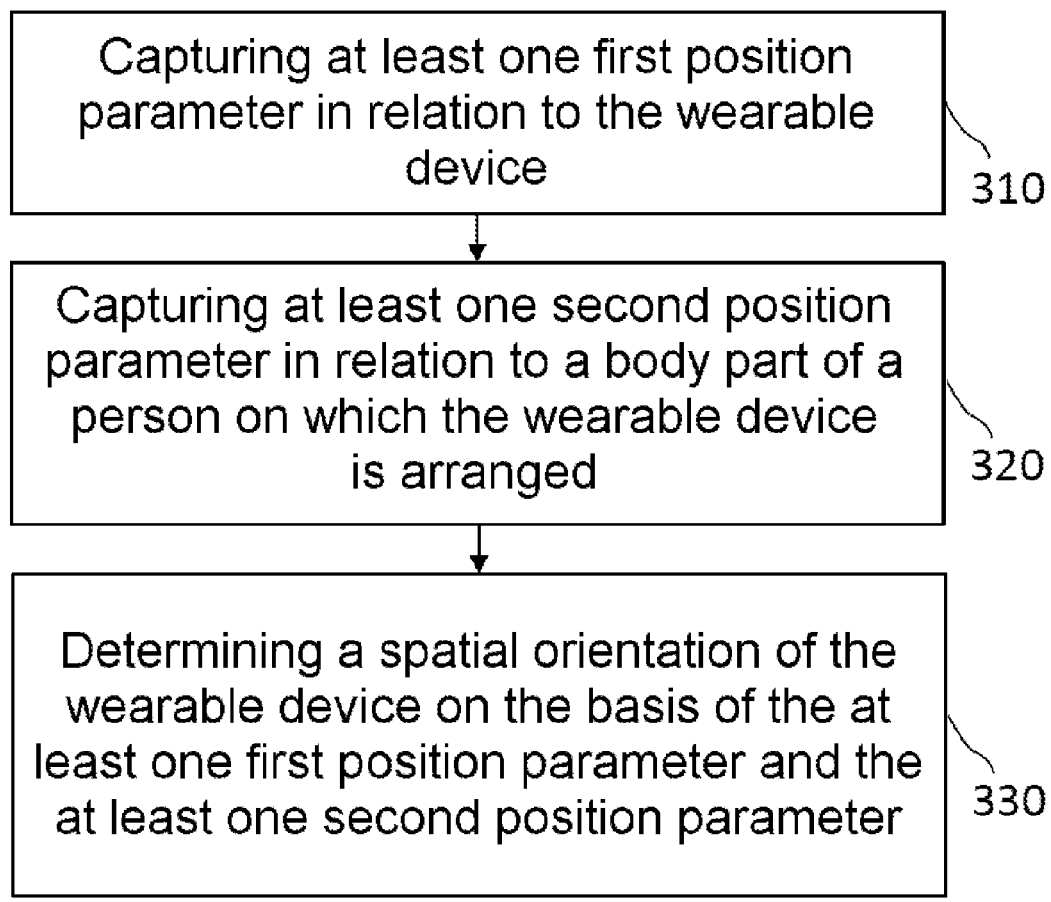
FIG. 3 shows a flowchart of a method for capturing a spatial orientation of a wearable device according to embodiments of the present disclosure.

FIG. 3 schematically shows a flowchart of a method 300 for capturing a spatial orientation of a wearable device according to embodiments of the present disclosure.

The method 300 may be implemented by appropriate software that is able to be executed by one or more processors (for example a CPU).

The method 300 comprises capturing at least one first position parameter in relation to the wearable device, for example a pair of smart glasses, in block 310; capturing at least one second position parameter in relation to a body part of a person, for example a head, on which the wearable device is arranged in block 320; and determining a spatial orientation of the wearable device on the basis of the at least one first position parameter and the at least one second position parameter in block 330.

In some embodiments, one or more cameras can be installed in a vehicle (for example in the instrument panel). These can be used by a deep learning-based intelligent system in order to implement a continuous recording of individual images of the cameras for the purposes of determining the pose of the smart glasses. By way of example, in this case the system uses the head information present and the relationship thereof with the worn smart glasses for the purposes of improving the accuracy of the pose of the smart glasses.

By way of example, the cameras record images of the driver of the vehicle. There can be continuous learning on the basis of the individual images and the latter can be used to determine the pose of the smart glasses (assisted by the head information). This pose can be transferred to the smart glasses in order to display the virtual objects realistically. Cameras in the infrared spectrum are particularly advantageous for use in the vehicle due to the controlled, largely interference-free and consistent exposure of the image data. From a large amount of training data, the trained system is automatically able to determine features, such as contrast gradients and edges in the images, which the system may use implicitly at runtime for pose determination purposes. In some embodiments, the system according to the invention can keep learning continuously and improve the pose determination.

Although the invention has been explained and illustrated in more detail through preferred exemplary embodiments, the invention is not restricted to the disclosed examples and other variations may be derived therefrom by a person skilled in the art without departing from the scope of protection of the invention. It is therefore clear that there are a multiplicity of variation options. It is likewise clear that embodiments mentioned by way of example actually only constitute examples that should not be understood in any way as limiting for instance the scope of protection, the application options or the configuration of the invention. On the contrary, the above description and the description of the figures give a person skilled in the art the ability to implement the exemplary embodiments in specific terms, wherein a person skilled in the art with knowledge of the disclosed concept of the invention may make numerous modifications, for example with regard to the function or the arrangement of individual elements mentioned in an exemplary embodiment, without departing from the scope of protection defined by the claims and their legal counterparts, such as for instance further explanations in the description.

What is claimed is:

1. A system for capturing a spatial orientation of a wearable device, comprising:
   at least one capturing unit, which is configured to:
   capture at least one first position parameter in relation to a position of the wearable device within an environment; and
   capture at least one second position parameter in relation to a position of a body part of a person on which the wearable device is arranged, the position of the body part being a position within the environment; and
   at least one processor, which is configured to determine a spatial orientation of the wearable device on the basis of both of the at least one first position parameter and the at least one second position parameter.

2. The system according to claim 1, further comprising:
   a learning unit, which is configured to carry out deep learning on the basis of captured data from the at least one capturing unit.

3. The system according to claim 1, wherein the system is designed to capture the spatial orientation of the wearable device in relation to a passenger compartment of a vehicle.

4. The system according to claim 1, wherein the system is designed to provide an augmented reality function for the wearable device based on the determined spatial orientation of the wearable device.

5. The system according to claim 1, wherein the at least one capturing unit comprises a camera.

6. The system according to claim 5, wherein the camera is a passenger compartment camera and/or an infrared camera.

7. A vehicle comprising the system according to claim 1.

8. An assistance system, comprising:
   the system according to claim 1, and
   the wearable device.

9. The assistance system according to claim 8, wherein the wearable device is a pair of glasses.

10. The assistance system according to claim 9, wherein the pair of glasses is a pair of augmented reality glasses.

11. A method for capturing a spatial orientation of a wearable device, comprising:
   capturing at least one first position parameter in relation to a position of the wearable device within an environment;
   capturing at least one second position parameter in relation to a position of a body part of a person on which the wearable device is arranged, the position of the body part being a position within the environment; and determining a spatial orientation of the wearable device on the basis of both of the at least one first position parameter and the at least one second position parameter.

12. A computer product comprising a non-transitory computer readable medium having stored thereon program code which, when executed via one or more processors, carries out the acts of:

capturing at least one first position parameter in relation to a position of the wearable device within an environment;

capturing at least one second position parameter in relation to a position of a body part of a person on which the wearable device is arranged, the position of the body part being a position within the environment; and determining a spatial orientation of the wearable device on the basis of both of the at least one first position parameter and the at least one second position parameter.

* * * * *